United States Patent
Xiong et al.

(10) Patent No.: US 11,694,722 B1
(45) Date of Patent: Jul. 4, 2023

(54) DATA TIMESTAMP AND READ COUNTER FOR MAGNETIC RECORDING DEVICES

(71) Applicant: Western Digital Technologies, Inc., San Jose, CA (US)

(72) Inventors: Shaomin Xiong, San Jose, CA (US); Erhard Schreck, San Jose, CA (US); Robert Smith, San Jose, CA (US); Sukumar Rajauria, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/651,100

(22) Filed: Feb. 15, 2022

(51) Int. Cl.
*G11B 27/36* (2006.01)
*G11B 20/18* (2006.01)
*G11B 21/10* (2006.01)

(52) U.S. Cl.
CPC ................... *G11B 21/106* (2013.01)

(58) Field of Classification Search
CPC ..... G11B 13/08; G11B 5/4866; G11B 5/6088; G11B 7/126; G11B 2005/0021; G11B 5/00; G11B 27/36; G11B 5/58; G11B 20/12; G11B 20/18
USPC .............................................. 360/48, 75, 31
See application file for complete search history.

(56) References Cited

U.S. PATENT DOCUMENTS

| | | | |
|---|---|---|---|
| 6,405,329 B1 * | 6/2002 | Colligan | G11B 20/10 714/36 |
| 7,107,388 B2 | 9/2006 | Zimmer et al. | |
| 7,256,962 B2 | 8/2007 | Tateishi | |
| 7,370,367 B2 | 5/2008 | Constantinou et al. | |
| 9,070,397 B1 * | 6/2015 | Ito | G11B 5/607 |
| 9,230,689 B2 | 1/2016 | Tuers et al. | |
| 9,251,257 B2 | 2/2016 | Johnson et al. | |
| 9,257,145 B1 | 2/2016 | Soderbloom et al. | |
| 10,366,714 B1 | 7/2019 | Olson et al. | |

(Continued)

FOREIGN PATENT DOCUMENTS

| | | |
|---|---|---|
| CN | 104391659 A | 3/2015 |
| CN | 106354425 A | 1/2017 |

(Continued)

OTHER PUBLICATIONS

Gonzalez "Hot Data vs Cold Data: It's Influence on Data Placement Decisions & What to Do About It," Hot Data vs. Cold Data: Influence on Data Placement Decisions [Webcast], DataCore Software, Jun. 23, 2022, Accessed Feb. 7, 2022, 17 pages, <https://www.datacore.com/event/hot-data-vs-cold-data/>.

(Continued)

*Primary Examiner* — Nabil Z Hindi
(74) *Attorney, Agent, or Firm* — Patterson & Sheridan, LLP; Steven H. VerSteeg (57) ABSTRACT

The present disclosure generally relates to using a data timestamp and/or a read counter to prevent data from being re-read and signal that the data has been accessed. The write assist element in the write head can be utilized to degrade the data or an allocated marker after the data has been read. The degradation functions as a read counter to indicate how many times the data has been read. Additionally and/or alternatively, a timestamp can be utilized. The timestamp is updated each time that the data has been accessed. In so doing, it is possible to determine whether data in a data storage device has been accessed.

19 Claims, 10 Drawing Sheets

(56) References Cited

U.S. PATENT DOCUMENTS

| | | |
|---|---|---|
| 10,679,650 B2 | 6/2020 | Bai et al. |
| 10,921,992 B2 | 2/2021 | Li |
| 10,936,003 B1 | 3/2021 | Wu et al. |
| 2006/0203693 A1 | 9/2006 | Aoyama |
| 2008/0239548 A1 | 10/2008 | Paul et al. |
| 2014/0082752 A1 | 3/2014 | Helak et al. |
| 2016/0246967 A1 | 8/2016 | Gross et al. |
| 2019/0391748 A1 | 12/2019 | Li |
| 2020/0272339 A1 | 8/2020 | Oberg |

FOREIGN PATENT DOCUMENTS

| | | | | |
|---|---|---|---|---|
| CN | 112130769 A | | 12/2020 | |
| FR | 2640794 A | * | 6/1990 | ............... G11B 5/00 |

OTHER PUBLICATIONS

Xiong et al. "Investigation of the Local Temperature Increase for Heat Assisted Magnetic Recording (HAMR)," IEEE Transactions on Magnetics, vol. 50, No. 4, Apr. 2014, 6 pages, DOI: 10.1109/TMAG.2013.2290760.

* cited by examiner

DATA TIMESTAMP AND READ COUNTER FOR MAGNETIC RECORDING DEVICES

BACKGROUND OF THE DISCLOSURE

Field of the Disclosure

Embodiments of the present disclosure generally relate to using a data timestamp and/or read counter to prevent data from being re-read.

Description of the Related Art

During forensic data evaluation on data storage devices, knowing the time sequence that data was written to the data storage device and read from the data storage device can be important. As artificial intelligence (AI) becomes more and more powerful, several techniques, such as deepfake, have been developed to modify or synthesize data which appears to be real. Some of the data may have significant negative impacts to society, such as misinformation on elections, pandemics, etc.

In order to modify or synthesize data, the data needs to be accessed (i.e., read) such that AI then knows what the original data is. Knowing what the original data is permits AI or bad actors to then determine how to modify the data or even synthesize new data that would be difficult if not impossible to detect as being modified or synthesized.

Given the difficultly in detecting modified or synthesized data, making data tamperproof would be ideal such that the bad actor or AI cannot even access the data. However, it is not easy to make all data tamperproof. In absence of making data tamperproof, it would be beneficial to know whether the data has been tampered with or, at the very least, accessed.

Therefore, there is a need in the art to be able to determine whether data in a data storage device has been accessed.

SUMMARY OF THE DISCLOSURE

The present disclosure generally relates to using a data timestamp and/or a read counter to prevent data from being re-read and signal that the data has been accessed. The write assist element in the write head can be utilized to degrade the data or an allocated marker after the data has been read. The degradation functions as a read counter to indicate how many times the data has been read. Additionally and/or alternatively, a timestamp can be utilized. The timestamp is updated each time that the data has been accessed. In so doing, it is possible to determine whether data in a data storage device has been accessed.

In one embodiment, a data storage device comprises: a magnetic head comprising a read head and a write head, wherein the write head comprises a write assist element; a magnetic storage media; and a controller configured to cause the data storage device to: read data from the magnetic storage media using the read head; and apply current to the write assist element, wherein the applied current: is insufficient to cause data to be written to the magnetic storage media, and changes an amplitude of the read data or a mark on the magnetic storage media.

In another embodiment, a data storage device comprises: a magnetic head comprising a read head and a write head, wherein the write head comprises an write assist element; a magnetic storage media; and a controller configured to cause the data storage device to: partially degrade data on the magnetic storage media or partially degrade a mark on the magnetic storage media; and cause the data to be read before or concurrently with the partially degrading.

In another embodiment, a data storage device comprises: a magnetic head comprising a read head and a write head; a magnetic storage media; and a controller coupled to the magnetic head and the magnetic storage media, wherein the controller is configured to: write a timestamp to the magnetic storage media, wherein the timestamp corresponds to a time that data was accessed on the magnetic storage media; read the data; and update the timestamp in response to the read data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to using a data timestamp and/or a read counter to prevent data from being re-read and signal that the data has been accessed. The write assist element in the write head can be utilized to degrade the data or an allocated marker after the data has been read. The degradation functions as a read counter to indicate how many times the data has been read. Additionally and/or alternatively, a timestamp can be utilized. The timestamp is updated each time that the data has been accessed. In so doing, it is possible to determine whether data in a data storage device has been accessed.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 1:
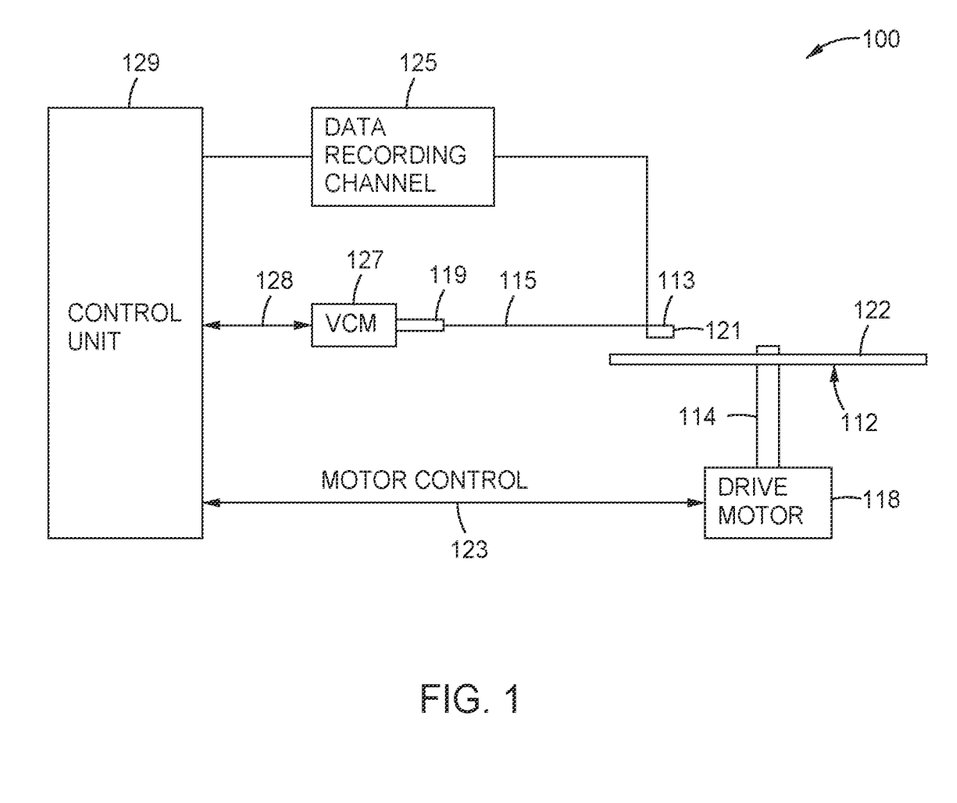
FIG. 1 illustrates a schematic view of a disk drive, according to one implementation.

FIG. 1 illustrates a schematic view of a disk drive (e.g., magnetic recording device) 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports the slider 113 off and slightly above the media 112 surface by a small, substantially constant spacing during normal operation. In an energy-assisted magnetic recording (EAMR) head, DC or AC electric-current flows through an assist element of the magnetic head assembly 121 and enhances the write-ability so that the write element of the magnetic head assembly 121 magnetizes the data bits in the media 112.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
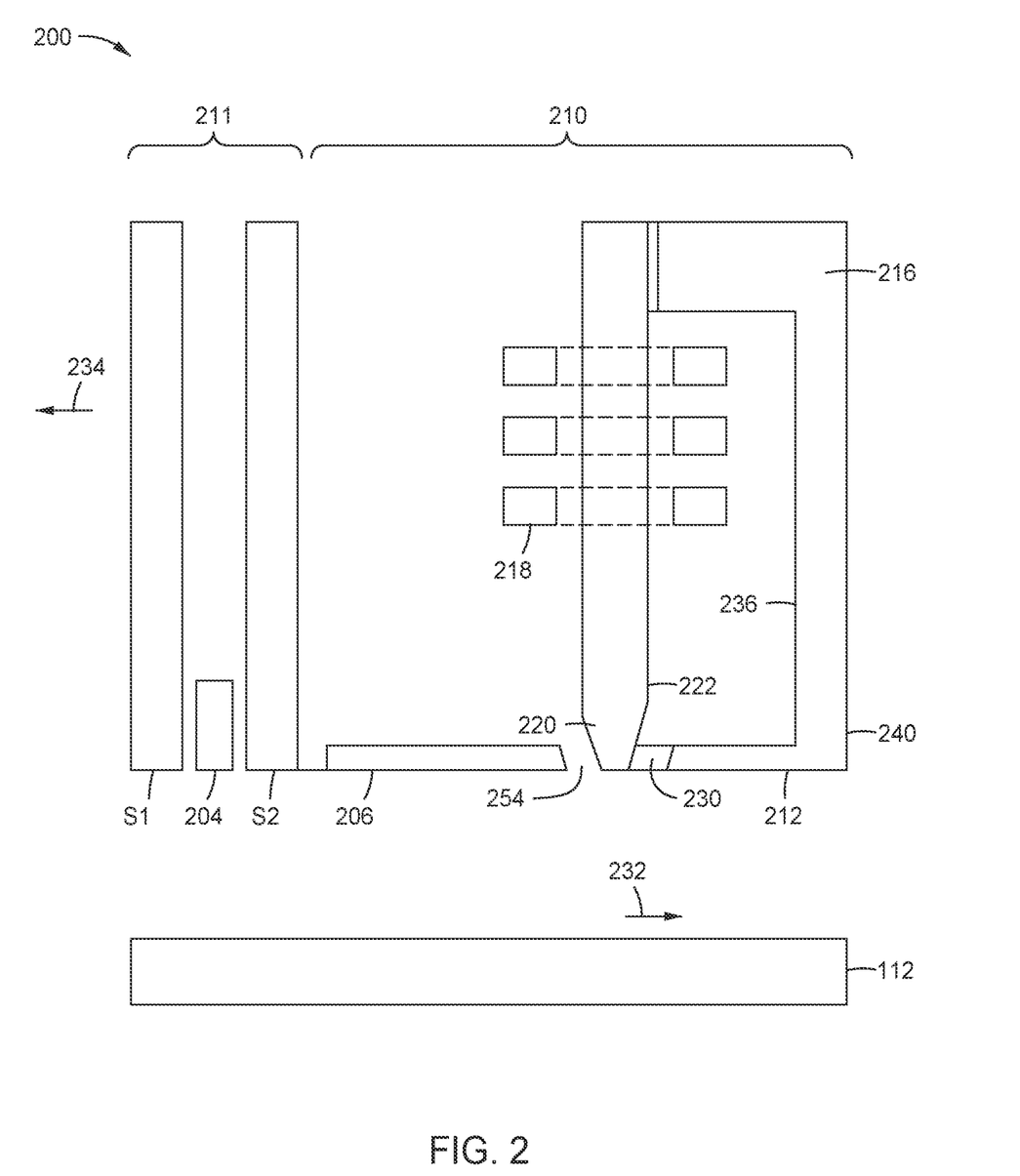
FIG. 2 is a fragmented and schematic cross-sectional side view through a center of a read/write head facing the magnetic media, according to one implementation.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a main pole 220, an upper-return pole coupled to a trailing shield 240, and a coil 218 that excites the main pole 220. The write head 210 also comprises a leading shield 206. The coil 218 may have a "pancake" structure which winds around a back-contact between the main pole 220 and the return pole 216, instead of a "helical" structure shown in FIG. 2. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni. The read/write head 200 may be an EAMR head that comprises a write assist element 230. The write assist element 230 is disposed between the main pole and at least one of: the trailing shield, the leading shield, the first side shield, and the second side shield. In one embodiment, a write assist element 230 is disposed between the trailing shield 240 and the main pole 220, as shown in FIG. 2, and/or between the leading shield 206 and the main pole 220 (gap 254). During writing, a DC or AC electric-current flows through the assist element to enhance writing performance.

In one embodiment, the write assist element 230 may include a spin torque oscillator (STO). In other embodiments, the write assist element 230 may include a multi-layer structure including magnetic and non-magnetic materials, or a structure including non-magnetic electrically conductive material, each configured to provide assistive effect for the write operation. Examples of such a structure include those described in U.S. Pat. No. 10,366,714, titled "Magnetic write head for providing spin-torque-assisted write field enhancement," to Olson et al. and in U.S. Pat. No. 10,679,650, titled "Current-assisted magnetic recording write head with improved write gap structure" to Bai et al., both of which are assigned to assignee of the current application and hereby incorporated by reference.

Figure 3:
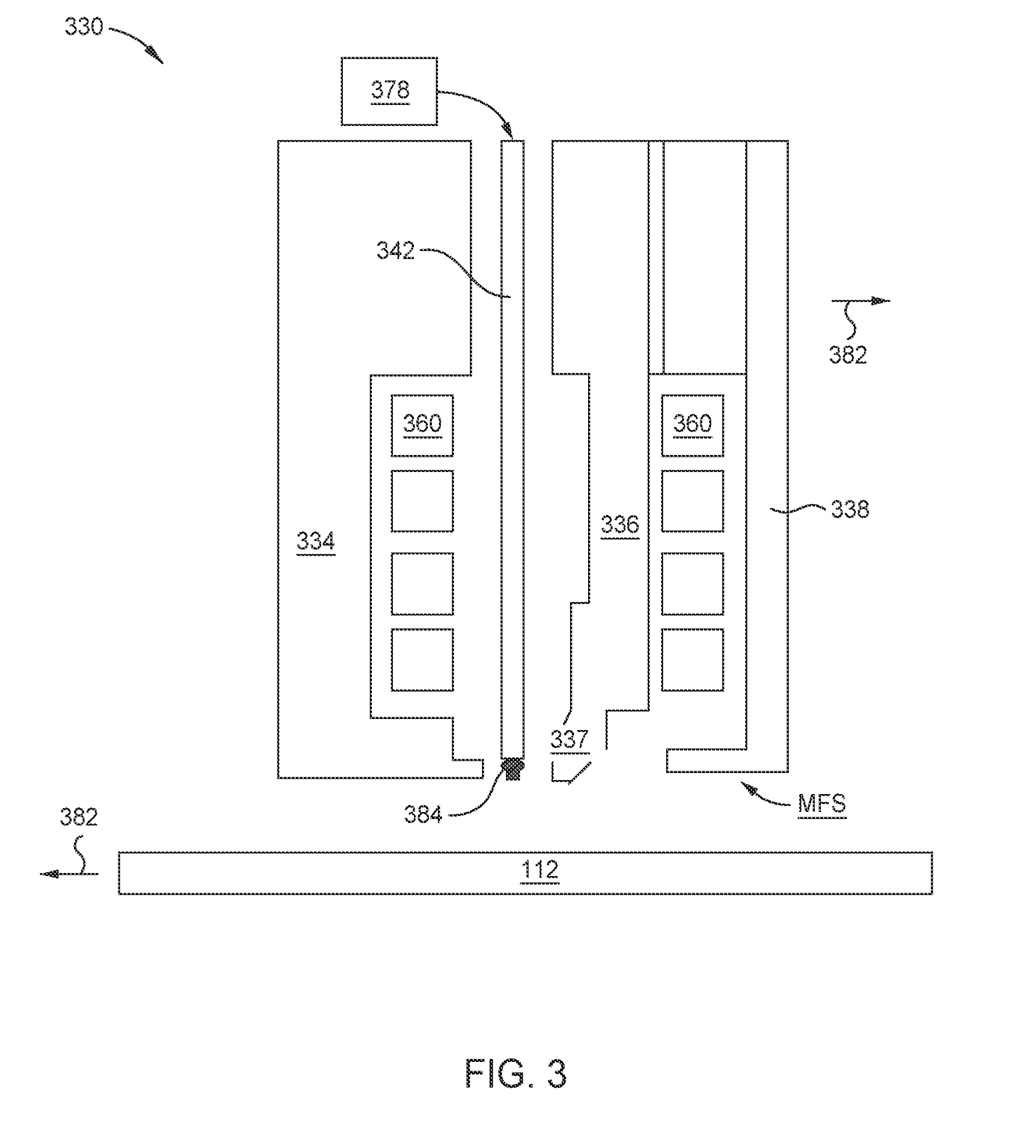
FIG. 3 is a schematic illustration of certain embodiments of a cross sectional side view of a HAMR write head facing a magnetic disk.

FIG. 3 is a schematic illustration of certain embodiments of a cross sectional side view of a HAMR write head 330 facing a magnetic disk 112. The HAMR write head 330 may correspond to part of the reading/recording head assembly 121 described in FIG. 1 or a recording head used in other magnetic media drives. The HAMR write head 330 includes a media facing surface (MFS), such as an air bearing surface (ABS) or a gas bearing surface (GBS), facing the disk 112. As shown in FIG. 3, the magnetic disk 112 and the HAMR write head 330 relatively moves in the direction indicated by the arrows 382.

The HAMR write head 330 includes a main pole 336 disposed between a leading shield 334 and a trailing shield 338. The main pole 336 can include a main pole tip 337 at the MFS. The main pole tip 337 can include or not include a leading taper and/or a trailing taper. A coil 360 around the main pole 336 excites the main pole tip 337 to produce a writing magnetic field for affecting a magnetic medium of the rotatable magnetic disk 112. The coil 360 may be a helical structure or one or more sets of pancake structures. The leading shield 334 and/or the trailing shield 338 can act as the return pole for the main pole 336.

The magnetic disk 112 is positioned adjacent to or under the HAMR write head 330. A magnetic field produced by current in the coil 360 is used to control the direction of magnetization of bits in the magnetic disk 112.

The HAMR write head 330 includes a structure for heating the magnetic disk 112 proximate to where the main pole tip 337 applies the magnetic write field to the storage media. A waveguide 342 is positioned between the main pole 336 and the leading shield 334. The waveguide 342 can includes a core layer and a cladding layer surrounding the core layer. The waveguide 342 conducts light from a light source 378 of electromagnetic radiation, which may be, for example, ultraviolet, infrared, or visible light. The light source 378 may be, for example, a laser diode, or other suitable laser light source for directing a light beam toward the waveguide 342. Various techniques that are known for coupling the light source 378 into the waveguide 342 may be used. For example, the light source 378 may work in combination with an optical fiber and external optics for directing a light beam to the waveguide 342. Alternatively, the light source 378 may be mounted on the waveguide 342 and the light beam may be directly coupled into the waveguide 342 without the need for external optical configurations. Once the light beam is coupled into the waveguide 342, the light propagates through the waveguide and heats a portion of the media, as the media moves relative to the HAMR write head 330 as shown by arrows 382.

The HAMR write head 330 can include a near-field transducer (NFT) 384 to concentrate the heat in the vicinity of the focal point of the waveguide 342. The NFT 384 is positioned in or adjacent to the waveguide 342 near or at the MFS. Light from the waveguide 342 is absorbed by the NFT 384 and excites surface plasmons which travel along the outside of the NFT 384 towards the MFS heating a precise area of the NFT 384 which in turn heats a precise area of the magnetic disk 112. One possible NFT 384 for the HAMR write head is a lollipop design with a disk portion and a peg extending between the disk and the MFS. The NFT 384 can be placed in close proximity to the main pole 336. The NFT 384 is relatively thermally isolated and absorbs a significant portion of the laser power while it is in resonance.

It is to be understood that while the description above has been in relation to a hard disk drive, the embodiments discussed herein are equally applicable to a tape drive that includes a write head having a write assist element (e.g., STO, NFT, etc.) as discussed above.

Figure 4:
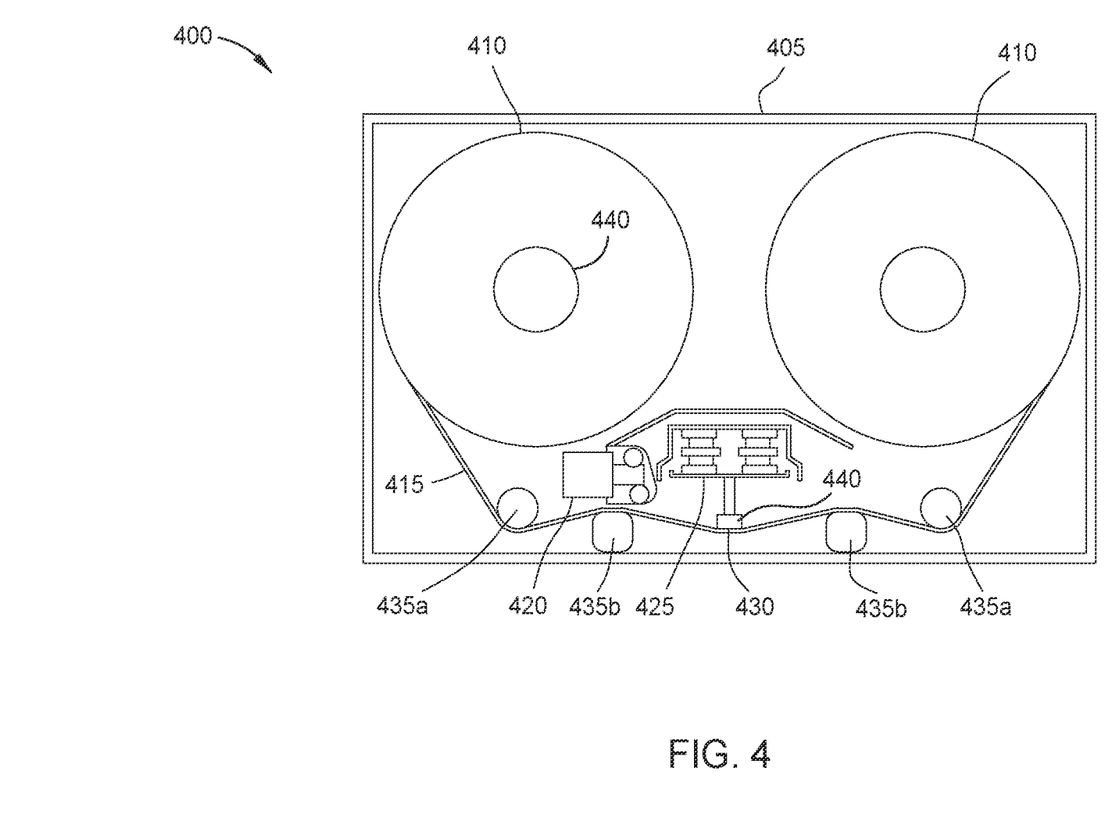
FIG. 4 is a simplified top down of a tape drive in accordance with some embodiments.

FIG. 4 illustrates a simplified top down view of a tape drive 400, in accordance with some embodiments. The tape drive 400 may be a tape embedded drive (TED). The tape drive 400 comprises a casing 405, one or more tape reels 410, one or more motors (e.g., a stepping motor 420 (also known as a stepper motor), a voice coil motor (VCM) 425, etc.) a head assembly 430 with heads 440 such as one or more read heads and one or more write heads, and tape guides/rollers 435a, 435b. In the descriptions herein, the term "head assembly" may be referred to as "magnetic recording head", interchangeably, for exemplary purposes. In an embodiment, most of the components are within an interior cavity of the casing, except a printed circuit board assembly, which is mounted on an external surface of the casing 405. In the descriptions herein, the term "tape" may be referred to as "magnetic media", interchangeably, for exemplary purposes.

In FIG. 4, two tape reels 410 are placed in the interior cavity of the casing 405, with the center of the two tape reels 410 on the same level in the cavity and with the head assembly 430 located in the middle and below the two tape reels 410. Tape reel motors located in the spindles of the tape reels 410 can operate to wind and unwind the tape media 415 in the tape reels 410. Each tape reel 410 may also incorporate a tape folder to help the tape media 415 be neatly wound onto the reel 410. One or more of the tape reels 410 may form a part of a removable cartridge and are not necessarily part of the tape drive 400. In such embodiments, the tape drive 400 may not be a tape embedded drive as it does not have embedded media, the drive 400 may instead be a tape drive configured to accept and access magnetic media or tape media 415 from an insertable cassette or cartridge (e.g., an LTO drive), where the insertable cassette or cartridge further comprises one or more of the tape reels 410 as well. In such embodiments, the tape or media 415 is contained in a cartridge that is removable from the drive 400. The tape media 415 may be made via a sputtering process to provide improved areal density. The tape media 415 comprises two surfaces, an oxide side and a substrate side. The oxide side is the surface that can be magnetically manipulated (written to or read from) by one or more read/write heads. The substrate side of the tape media 415 aids in the strength and flexibility of the tape media 415.

Tape media 415 from the tape reels 410 are biased against the guides/rollers 435a, 435b (collectively referred to as guides/rollers 435) and are movably passed along the head assembly 430 by movement of the reels 410. The illustrated embodiment shows four guides/rollers 435a, 435b, with the two guides/rollers 435a furthest away from the head assembly 430 serving to change direction of the tape media 415 and the two guides/rollers 435b closest to the head assembly 430 by pressing the tape media 415 against the head assembly 430.

The voice coil motor 425 and stepping motor 420 may variably position the tape head(s) transversely with respect to the width of the recording tape. The stepping motor 420 may provide coarse movement, while the voice coil motor 425 may provide finer actuation of the head(s). In an embodiment, servo data may be written to the tape media to aid in more accurate position of the head(s) along the tape media 415.

There is a wide variety of possible placements of the internal components of the tape drive 400 within the casing 405. In particular, as the head mechanism is internal to the casing in certain embodiments, the tape media 415 may not be exposed to the outside of the casing 405, such as in conventional tape drives. Thus, the tape media 415 does not need to be routed along the edge of the casing 405 and can be freely routed in more compact and/or otherwise more efficient ways within the casing 405. Similarly, the head(s) 430 and tape reels 410 may be placed in a variety of locations to achieve a more efficient layout, as there are no design requirements to provide external access to these components.

In some embodiments, the tape drive 400 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 405. The drive 400 may be filled by helium, nitrogen, hydrogen, or any other typically inert gas.

In various embodiments, the drive 400 includes controller integrated circuits (IC) (or more simply "a controller") (e.g., in the form of one or more System on Chip (SoC)), along with other digital and/or analog control circuitry to control the operations of the drive. For example, the controller and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller. As an example, the controller may be configured to execute firmware instructions for the various same gap verify embodiments described below.

Figure 5A:
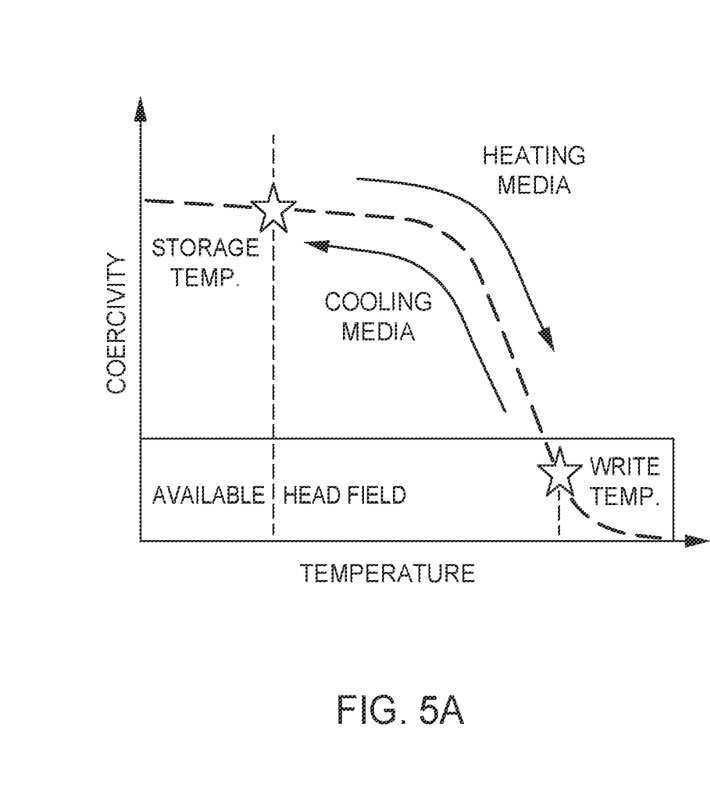
FIG. 5A is a graph illustrating coercivity versus temperature for a data storage device.

As will be discussed below, it would be valuable to know whether and/or how many times data has been read from a data storage device. Temperature of the media is a useful tool for obtaining such knowledge. There are temperatures for the media that are applicable to write and temperature applicable for storing data. There is also a temperature difference between the writing temperature and the storage temperature that may be useful for obtaining the knowledge. FIG. 5A is a graph illustrating coercivity versus temperature for a data storage device. As shown in FIG. 5A, as the media is heated, the coercivity goes down. Conversely, when the media is cooled, the coercivity goes up. As the temperature increases and the coercivity goes down, the media approaches the write temperature. Conversely, as the temperature decreases and the coercivity increases, the media approaches the storage temperature. Between the write temperature and the storage temperature, there is a range of temperature where the media is cooling/heating. It is the temperature between the write temperature and the storage temperature that may be utilized for the embodiments discussed herein. As will be discussed below, by utilizing the write assist element of a write head, in the absence of providing power or current to the write head itself, the knowledge can be obtained without writing over the read data. Temperature can be more broadly represented instead as energy to account for other type of assisted recording where energy other than heat is used (e.g., microwave assisted magnetic recording (MAMR), which uses a spin torque oscillator). For ease of illustration, the description below will refer to the temperature case under HAMR, but the general principles will apply to other forms of energy assisted recording.

Figure 5B:
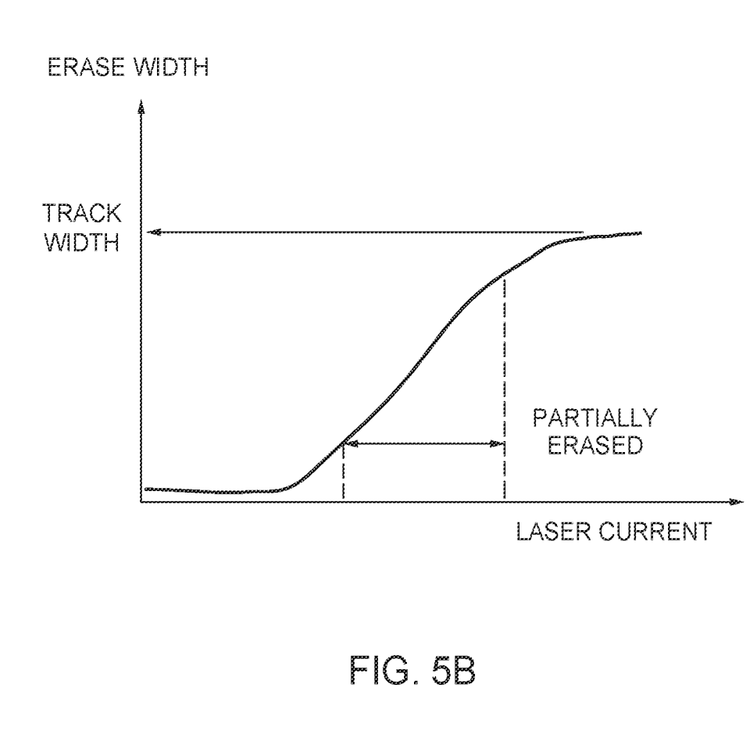
FIG. 5B is a graph illustrating power to a write assist element relative to track width for erasing data.

FIG. 5B is a graph illustrating power to a write assist element relative to track width for erasing data. As shown in the graph, as laser power increases, data is capable of being erased. At a sufficiently low power, data will not be erased. As power increases, the data can be partially erased, though not completely erased. Finally, at sufficient power, the data can be completely erased. It is to be noted, that data that is partially eased, can be erased to such a low amplitude that while the data is still present, the data is not readable. Thus, as shown in FIG. 5B, there is a laser power level (for HAMR applications), or more broadly, a write assist element power, that is insufficient to write data. That power level is the level that achieves the temperatures in FIG. 5A that are between the storage temperature (i.e., temperature achieved without any write head power or write assist element power) and the write temperature (i.e., temperature achieved with write head power and optional write assist element power).

It is the temperature between the storage temperature and the write temperature that the embodiments herein seek to exploit by providing power to the write assist element, without providing power to the write head itself. The power provided to the write assist element will be less than is necessary to write data, but sufficient to raise the temperature of the media (or more broadly, energy directed to the magnetic grains in the media) and degrade the data or a specially placed mark. After a single exposure to the write assist element, the data will still be readable, but after each exposure, the data (or mark) will degrade until eventually the data (or mark) is not readable. The degradation will be reflected in the amplitude of the data (or mark). The amount of degradation will be an indication of how many times the data has been read.

FIGS. 6A-6D are schematic illustrations of degradation of an allocated mark according to one embodiment. As shown in FIGS. 6A-6D, a data track 600 comprises data sectors 602A-N as well as a special mark 604. The mark 604 is located downtrack from data sector 602N as shown, such that when a reader or read head 606 is positioned over the data sector 602N, the write assist element 608 is positioned over the mark 604. The write assist element 608 is supplied with a current at a level that partially degrades the mark 604 each time data sector 602N is read by the read head 606.

While FIGS. 6A-6D show that the degradation of the mark 604 occurs simultaneous with when the data sector 602N is read, the degradation can also occur after the data sector 602N is read. Both the mark location and timing of mark degradation can vary, as explained below.

Figures 6A, 6B, 6C:
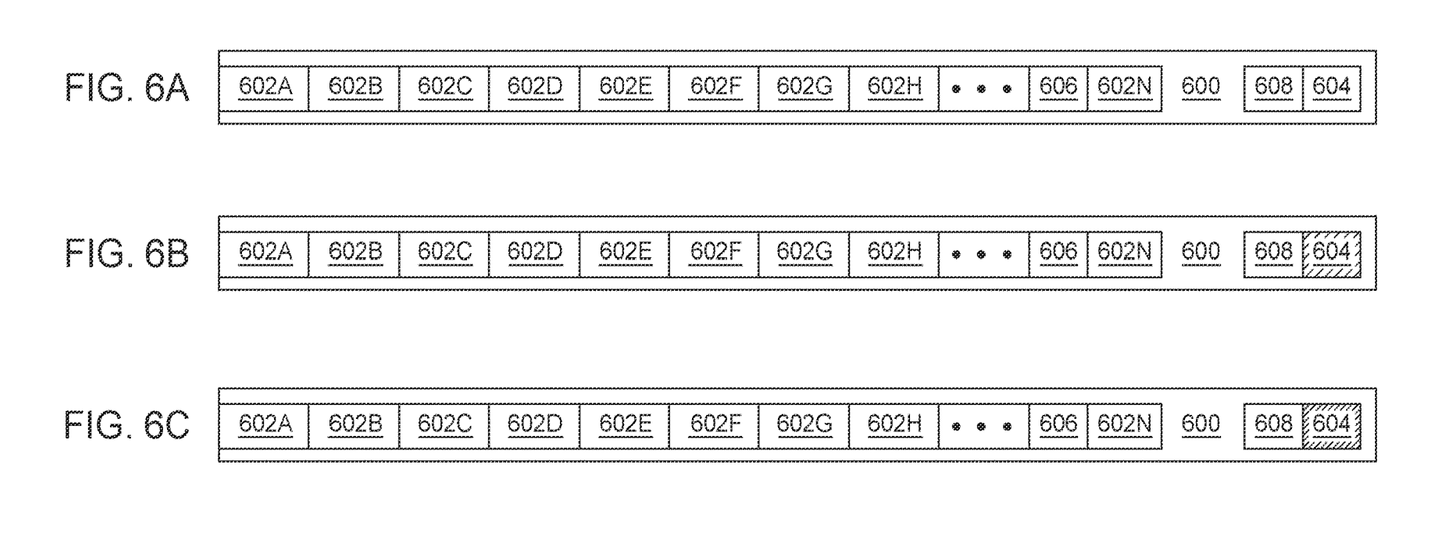
FIGS. 6A-6D are schematic illustrations of degradation of an allocated mark according to one embodiment.
Figure 6D:
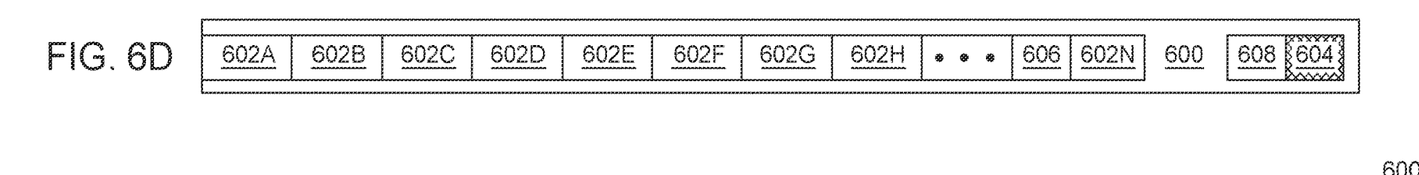
Figure 6E:
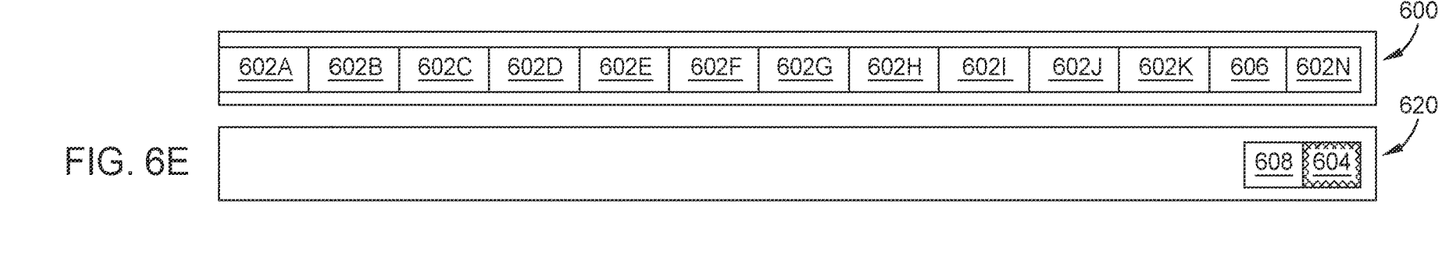
FIG. 6E is a schematic illustration of using an allocated mark according to another embodiment.

The placement of the write assist element 608 relative to the read head 606 may necessitate the degradation to occur after, rather than simultaneously with, reading the data sector 602N. For example, in an HDD, due to track skew when the head is placed at certain radial locations of the disk media (e.g., near the inner diameter (ID) or outer diameter (OD)), the write assist element may be over a different track than the track where the read head is reading. For example, the write assist element 608 may be over an adjacent track to, or several tracks away from, the track at which the data sector 602N is being read. Two options are possible for mark degradation. In one embodiment, the recording head can be controlled to move after the read so the write assist element 608 is over the mark 604 downtrack from the data sector 602N. This would likely mean the head movement would be coordinated with the disk rotation so the write assist element 608 is put on the track 600 one disk revolution later after the read. In another embodiment, the mark 604 can be on a different track 620 either immediately adjacent (as shown in FIG. 6E) or some number of tracks away from the track 600, so that the mark 604 is degraded simultaneously by the write assist element 608 while the read head 606 is reading data sector 602N, accounting for the track skew.

Regardless of how the degradation occurs, mark 604 in one embodiment may be a pre-designated or special periodic pattern such that the amplitude of the mark 604 can be measured as an indicator how many times degradation has occurred. The amplitude corresponds to a number of times that the mark 604 has been degraded, which corresponds to the number of times the data sector 602 has been read.

After sufficient degradation of the mark 604, or stated another way, after a predetermined number of reads of the data sector 602, the mark 604 will be very weak such that there will be difficulty in measuring the amplitude of the mark 604. In such a situation, the mark can be rewritten if there is no desire to move the data sector 602 while still desiring to access the data sector 602. The rewritten mark may be different from the original mark 604 such as having a different pattern or frequency. Also, if desired, the data can simply marked as invalid for future reads if the mark 604 is neither rewritten nor the data sector 602 moved. In FIG. 6A, the mark 604 has not been degraded as the data sector 602 has not been read (figure shows initial moment when read head 606 and write assist element 608 have arrived at data sector 602N and mark 604). In FIG. 6B, the mark 604 is slightly degraded compared to FIG. 6A as the data sector 602 has been read. In FIG. 6C, the mark 604 has degraded even further compared to FIG. 6B as the data sector 602 has been read at least one additional time compared to FIG. 6B. Finally in FIG. 6D, the mark 604 has degraded sufficiently that the mark 604 has an amplitude that is too low to measure. The mark 604 can be unique to each data sector(s) to which it is associated, such that when the associated data sector or sectors is/are read, the mark 604 is partially degraded by the write assist element 608, and measuring the amplitude of the mark 604 gives the number of times an associated data sector or sectors (e.g., data sector 602N, or data sectors 602A-N) has been read.

Several options are possible in determining how a mark can be associated with data that is being written. In one embodiment, a mark can be pre-set to repeat every Nth sector or according to any other pattern. For example, if after every $8^{th}$ sector is a mark, the 8 sectors prior would be designated for storing data, and are associated with the mark. A read of sector no. 8 of the 8 sectors would result in the mark being degraded, as described above, and by extension all 8 sectors would be counted as read when a degradation occurs. Since the host typically writes multiple sectors at a time for a discrete unit of host data, a later read of that discrete unit of written host data would likely degrade one or more marks associated with the sectors where such data is written. To extend the same example, if a file from the host occupies 32 sectors, reading the file would degrade 4 marks, and any or all of the 4 marks can be used to track reads of that file. The selection of mark frequency can be tailored according to host write patterns and other trade-off considerations like format efficiency. In another embodiment, the marks are not pre-set, but are instead written at a location near (e.g., downtrack, adjacent track) the last written sector of a write operation. For example, a host may write two files, with file 1 spanning 24 sectors and file 2 spanning 64 sectors. A first mark can be written after sectors 1-24 are written (for file 1), e.g., downtrack or at a nearby track, and a second mark can be written after sectors 25-88 are written (for file 2), e.g., downtrack or at a nearby track.

In various embodiments, a mapping table may be used to correlate a data sector with an associated mark. The mapping table can account for how the marks are associated with data sectors, including for the marks that are associated with data sectors from different tracks, pre-set marks recurring at a designated frequency, or non-pre-set marks that are written at the end of write operations, as described above.

FIGS. 7A-7D are schematic illustrations of degradation of data according to one embodiment. As shown in FIGS. 7A-7D, a data track 700 comprises data sectors 702. A reader or read head 704 and a write assist element 706 are positioned over the data sectors 702. The write assist element 706 degrades the data 702 each time data 702 is read by the read head 704. Unlike the mark 604 in FIGS. 6A-6D that is written in a special pattern, the embodiment shown in FIGS. 7A-7D measures how the read channel handles the data that has been degraded. In certain embodiments, metrics related to processing the read signals (e.g., signal amplitudes, error encountered or corrected) can be extracted from the read channel to provide an estimate as to a number of times that the data 702 has been degraded, which corresponds to the number of times the data 702 has been read.

Figure 7A:
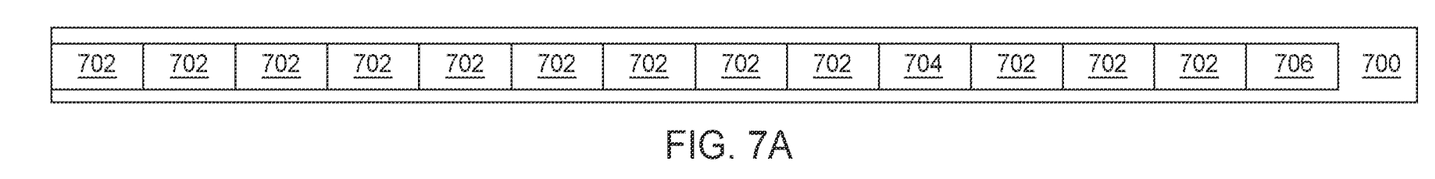
FIGS. 7A-7D are schematic illustrations of degradation of data according to one embodiment.
Figure 7B:
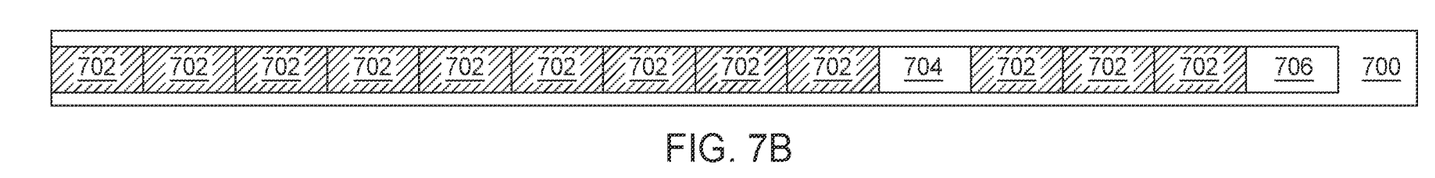
Figure 7C:
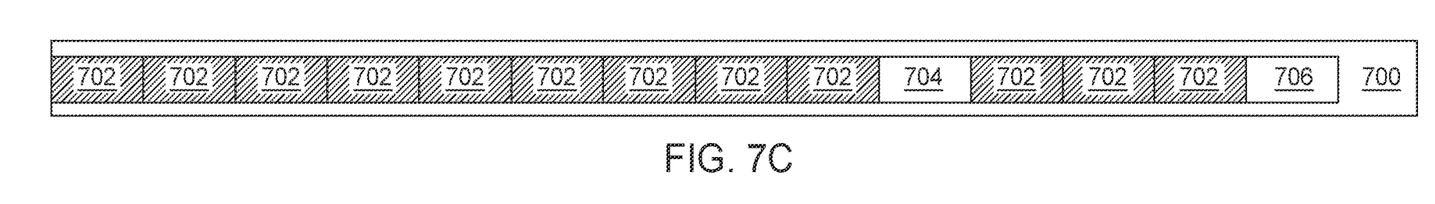

After sufficient degradation of the data 702, or stated another way after a predetermined number of reads of the data 702, the data 702 will be degraded such that there will be difficulty in measuring the read channel metrics such as amplitude or error encountered or corrected for the data 702. In such a situation, the data 702 can be rewritten if there is a desire to still access the data 702. In FIG. 7A, the data 702 has not been degraded as the data 702 has not been read. In FIG. 7B, the data 702 is slightly degraded compared to FIG. 7A as the data 702 has been read. In FIG. 7C, the data 702 has degraded even further compared to FIG. 7B as the data 702 has been read at least one additional time compared to FIG. 7B. Finally in FIG. 7D, the data 702 has degraded sufficiently that the data 702 has channel metrics that are too low to measure.

Figure 7D:
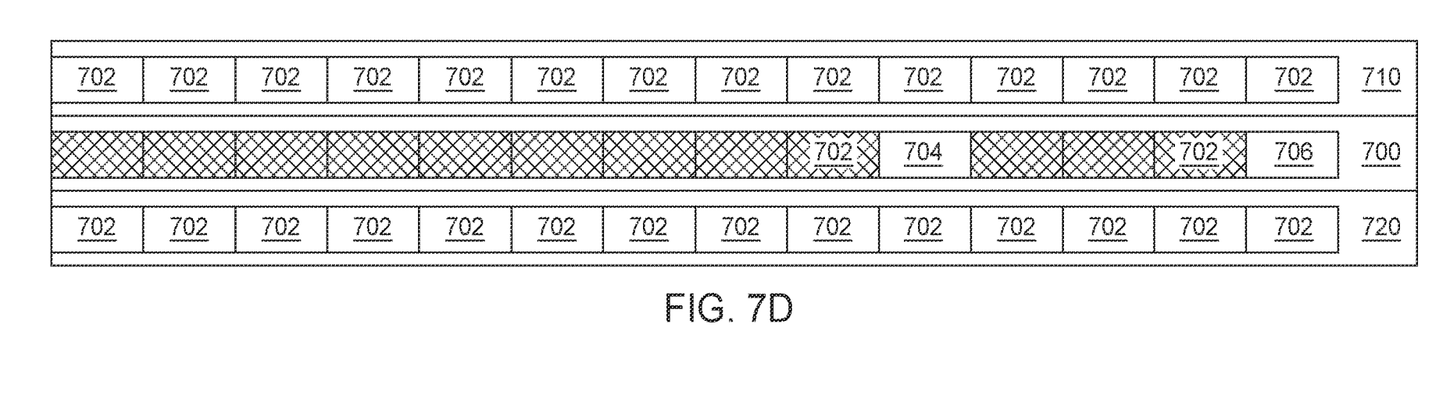

FIG. 7D additionally shows adjacent tracks 710, 720 where the data 702 has not been read and hence, has not degraded. Thus, data 702 is one track 700, data 702 is adjacent tracks do not degrade due to the degradation of data 702 in the one track 700. The data 702 in track 700 is degraded after reading. The degradation occurs by the write assist element 706. The more that the data 702 is read, the more the data degrades. Measuring the level of degradation provides the number of read times of the data 702. After several reads which result in the degradation, it will become difficult to retrieve the data because the signal of the data 702 is too weak. In such a scenario, the data can be rewritten to the same location or transferred to a 'hot' data storage device/system. Stated another way, when the data 702 is read, the write assist element 706 is at a low power mode to partially degrade the data. The signal amplitude of the data becomes lower, but the data can still be retrieved in the future until the amplitude is too low to permit the data 702 to be read at which time the data 702 can be rewritten or moved to a 'hot' storage location.

In degrading the mark 604 or the data 702, the power level to the write assist element 608, 706 will be sufficiently below the power level necessary to write data. The power level can be set to a level that will degrade the mark 604 or data 702 over a predetermined number of reads. To determine the degradation, the magnitude of the amplitude will be less with each read and/or the noise level of the amplitude will be different. The degradation is done by decay of the amplitude. In one embodiment, the write assist element 608, 706 that degrades the data 702 or mark 604 is a STO. In another embodiment, the write assist element 608, 706 is a NFT. During the degradation, power to the writer or write head is not present even though power is provided to the write assist element 608, 706. It is of note that even though power to the write assist element 608, 706 is present, the amount of power provided is less than is necessary to write data, even in absence of power to the write head itself. In the event that the write assist element 608, 706 is a NFT, NFT thermal expansion does not impact degradation. Furthermore, the write assist element 608, 706 is selectively powered to ensure the write assist element 608, 706 does not degrade anything accidentally. Additionally, in some embodiments, the control gate of the write assist element 608, 706 is coupled to, or otherwise synchronized with, the read gate of the read head 606, 704, so that write assist element 608, 706 is selectively turned on or off in coordination with the reading of the data sector 602, 702, or in the case of track skew or other scenarios, the head can be moved at a later revolution of the disk to place the write assist element on the same track after the read head has finished reading.

It is noted that while FIGS. 6A-6E and 7A-7D are described with respect to various HDD embodiments, they are equally applicable to tape recording embodiments. In tape, the write and read head modules are aligned along the tracks, so the marks can be placed on the same track as the written data. Also, in certain embodiments including for both HDD and tape recording, the marks can be placed uptrack from the data. In tape recording where a read module is typically placed between two write modules, one write module could be uptrack from the data to enable simultaneous degradation, while in HDD recording, the uptrack mark could be degraded after the read has occurred.

Figure 8:
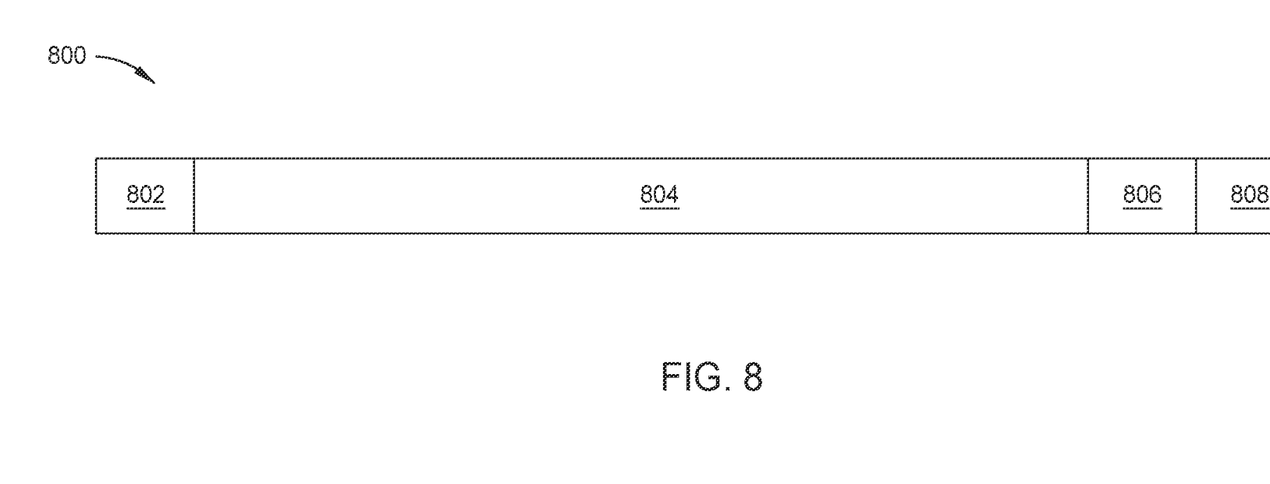
FIG. 8 is a schematic illustration of utilizing a timestamp according to one embodiment.

FIG. 8 is a schematic illustration of utilizing a timestamp according to one embodiment. The data sector 800 includes a sync field 802, the data field 804, a time stamp field 806, and error correction code (ECC) 808. The time stamp field 806 is added after the data and is written after the data 804 has been written. The time stamp is metadata taking up about 5 bytes of storage. The time stamp does not need to be absolute time, but rather, a time corresponding to when the data was written to the media. It is contemplated that the time stamp can be used for a read counter by changing the time stamp value each time the data is read. In one embodiment, the time stamp value is changed by changing the read amplitude of the time stamp using the write assist element. In another embodiment, the time stamp value is changed by changing the pattern of the time stamp using the write head and not simply the write assist element. For example, the time stamp can coordinate with the actual day/time; the lifetime of the drive; or a simple number that increases with each read (i.e., 0, 1, 2, 3, etc.). It is contemplated that after a predetermined period of time or reads, the data cannot be further read. The time stamp can be added in a similar manner to ECC 808 as metadata for each individual data block written. In HDD applications, the time stamp would be either for each 512 bytes or 4 kB data block. For HDDs, an already existing power on timer information could be used as a basic relative time information for the time stamp.

Figure 9:
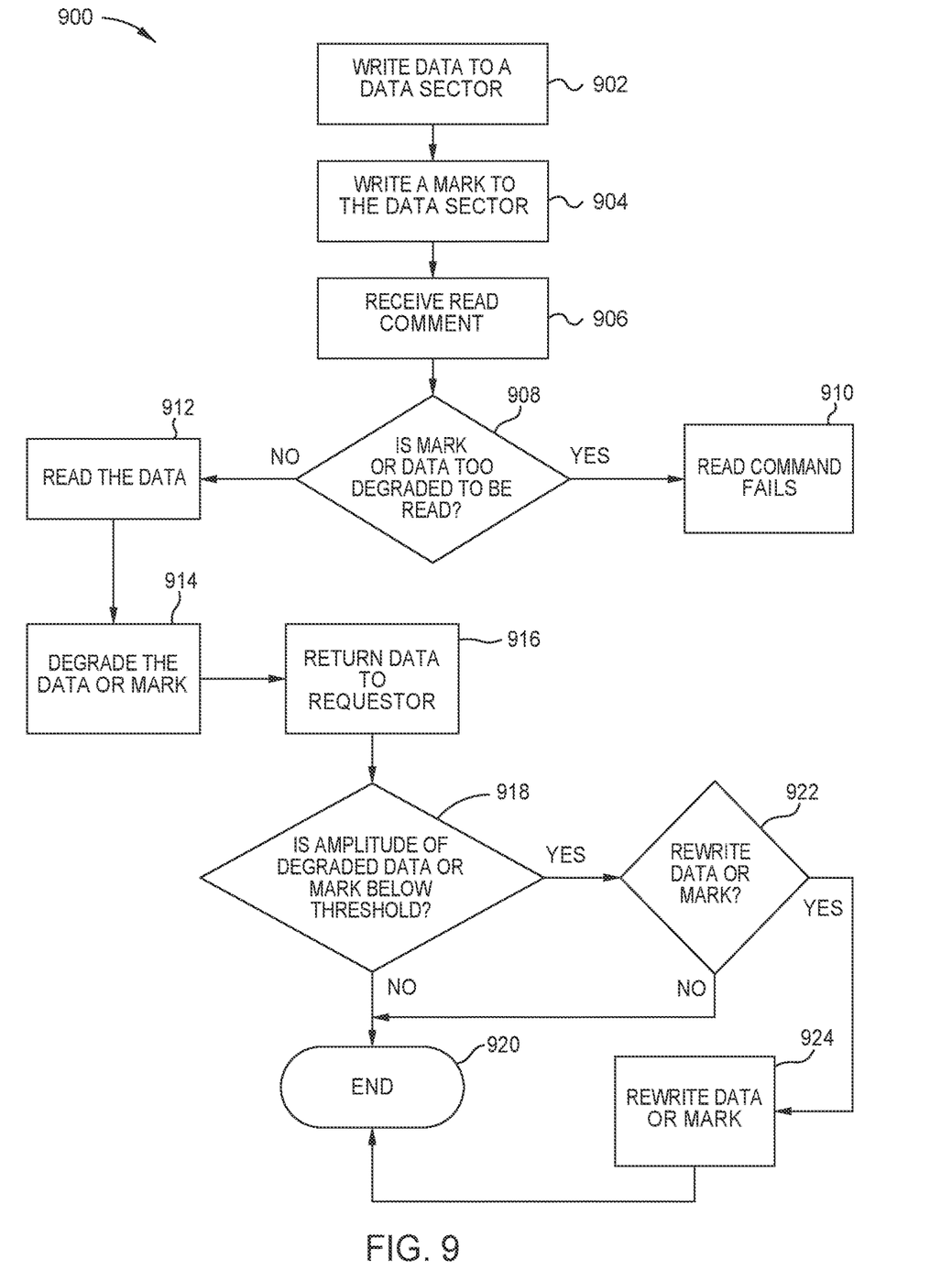
FIG. 9 is a flowchart illustrating degradation of data or a mark on a magnetic recording media.

FIG. 9 is a flowchart 900 illustrating degradation of data or a mark on a magnetic recording media. Initially, data is written to a particular data sector 902. Once the data has been written, a special mark may optionally be written as well at 904. The special mark may be disposed within the same track as the data, a track adjacent to the data, or another track further away. Now that data is in place, the data is ready to be read upon receipt of the read command at 906. Prior to reading the data, a determination is made regarding whether the mark (or the data) is too degraded to be read at 908. If the mark (or data) is too degraded to be read, then the read command fails at 910. However, if the mark (or data) is not too degraded, then the data is read at 912. Following the reading, the mark (or data) is degraded 914 to change the amplitude of the mark (or data) as an indication of the data having been read. The data may be returned to the requestor at 916. It is to be understood that once the data has been read at 912, the degrading at 914 and the returning at 916 may occur in any order or simultaneously.

Now that the data has been read, a determination is made regarding whether the data reading has reached a threshold. Stated another way, the data may only be read a predetermined number of times before the mark (or data) is degraded to the point where the mark (or data) cannot be read. The mark (or data) is read by measuring the amplitude of the mark (or data) to determine if the amplitude has fallen below a predetermined threshold at 918. If the amplitude has not fallen below the predetermined threshold, then the data may be read again upon receipt of another read command. However, if the amplitude is below the predetermined threshold, then a determination is made regarding whether the mark (or data) should be rewritten at 922. If the mark (or data) is not to be rewritten, then the data will not be readable upon receipt of the next read command for the data. If a determination is made to rewrite the mark (or data), then the mark (or data) is rewritten at 924 and the data can then be retrieved upon receipt of a read command for the data.

The rewriting the mark (or data) may occur in several manners. One manner is to simply rewrite the mark in the same location. Another manner is to rewrite the data and/or the data and mark in a new location. In moving the data and/or the data and mark, the data and/or the data and mark may be moved to a 'hot' location that is typically utilized to store data that is frequently accessed. Yet another manner is to rewrite the data in the same location. It is contemplated that the read counter can be used to measure "data temperature". For example, if a data is read once per year, the data is probably the cold data and can be archived in a cheaper storage media such as HDD or on tape, but if the data is read 100 times per hour, then the data is a hot data can be stored in a high performance HDD.

Figure 10:
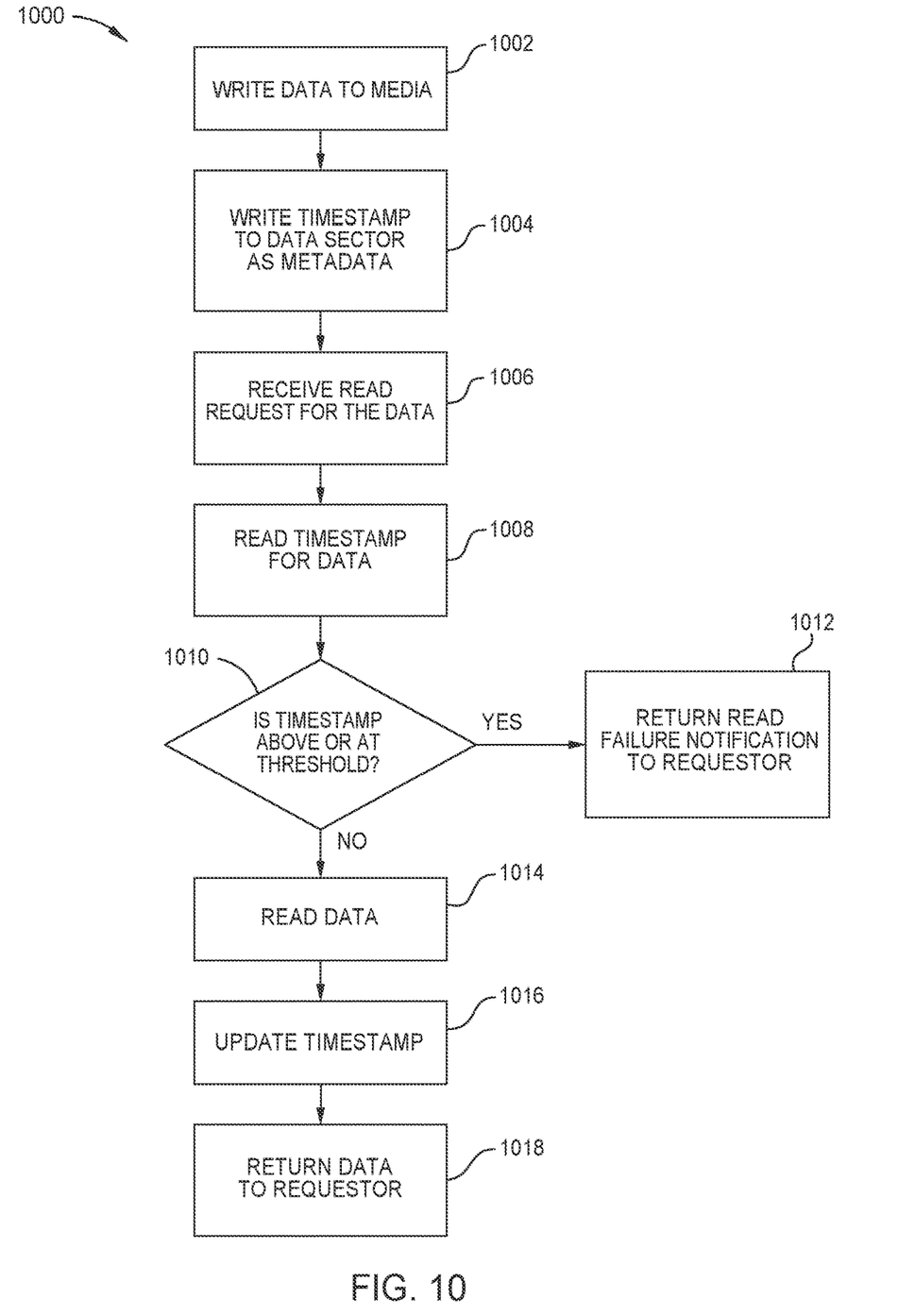
FIG. 10 is a flowchart illustrating the use of a timestamp according to one embodiment.

FIG. 10 is a flowchart 1000 illustrating the use of a timestamp according to one embodiment. Initially, the data is written to the magnetic media at 1002, and a timestamp is written to the data sector as metadata at 1004. It is contemplated that the timestamp will function in one of two possible manners. One manner is that the timestamp will degrade with each read and thus, the amount of degradation is an indication of how many reads have occurred. Another manner is to change the pattern of the timestamp each time a read occurs such that the pattern indicates when the last read has occurred. Once a read request for the data has been received at 1006, the timestamp is read at 1008, and a determination is made regarding whether the timestamp is below or at a predetermined threshold at 1010. The predetermined threshold may correspond to a time period after which the data is not to be read or an indication of when the last read has occurred. If the timestamp is at or above the predetermined threshold, then a read failure notification is returned to the requestor at 1012. If the timestamp is below the predetermined threshold, then the data is read at 1014, the timestamp is updated at 1016, and the data is returned to the requestor at 1018. It is contemplated that the updating at 1016 and the returning at 1018 may occur in any order or simultaneously.

In regards to the updating 1016, the updating 106 may occur in several manners. One such manner is to use the write assist element to partially degrade the timestamp and hence, update the timestamp. Initially, the timestamp is written, and the written timestamp is partially degraded after each read. The partial degrading involves changing the amplitude of the timestamp. Hence, the predetermined threshold at 1010 is the amplitude of the timestamp. Thus, when the amplitude of the timestamp falls below the predetermined threshold, then the read failure notification is returned at 1012. Alternatively, in regards to updating 1016, the timestamp is changed by changing the pattern (i.e., rewriting the timestamp), which involves using the write head and not merely the write assist element. Hence, the threshold is a particular pattern written as the timestamp. When the particular pattern is read and hence, detected, the threshold is met and the read failure notification is given at 1012.

By utilizing the write assist element in a write head to degrade the data or an allocated marker, it is possible to determine whether data in a data storage device has been accessed. Furthermore, utilizing and updating a timestamp also provides information on whether data in a data storage device has been accessed. The degradation and/or time stamp hard codes the data written time and counts how many times the data has been read. The various embodiments discussed herein are applicable to data storage management such as differentiating between 'hot' and 'cold' data; wear leveling for HAMR that has relatively poorer reliability; enabling storage device diagnostics that tracks the total number of reads and writes; and for law enforcement or government environments where tracking data usage is necessary.

In one embodiment, a data storage device comprises: a magnetic head comprising a read head and a write head, wherein the write head comprises a write assist element; a magnetic storage media; and a controller configured to cause the data storage device to: read data from the magnetic storage media using the read head; and apply current to the write assist element, wherein the applied current: is insufficient to cause data to be written to the magnetic storage media, and changes an amplitude of the read data or a mark on the magnetic storage media. The mark is disposed on a track different from the read data. The mark is located to account for skew such that the write assist element is over the mark while the read head is reading a data sector storing the data. The data can be read after changing the amplitude of the data. The applying current to the write assist element occurs after reading the data. The reading the data and the applying the current are performed concurrently. The magnetic recording media comprises a mark associated with a data sector on which the read data is stored, the mark being degraded by the applying the current. The amplitude of the mark is changed, the amplitude of the read data remains unchanged. The magnetic recording media comprises a plurality of marks, each mark associated with a set of plurality of N data sectors. The magnetic recording media is a hard disk drive. The magnetic recording media is a magnetic tape.

In another embodiment, a data storage device comprises: a magnetic head comprising a read head and a write head, wherein the write head comprises an write assist element; a magnetic storage media; and a controller configured to cause the data storage device to: partially degrade data on the magnetic storage media or partially degrade a mark on the magnetic storage media; and cause the data to be read before or concurrently with the partially degrading. The partially degrading is performed by the write assist element. The partially degrading after the data has been read a first time. The controller is further configured to rewrite the data to a different location on the magnetic storage media after the partially degrading. The controller is configured to repeat the partially degrading and the causing the data to be read. The controller is further configured to measure an amplitude of the data or mark to determine a number of reads performed on the data. The controller is further configured to extract metrics from a read channel processing signals from reading the data or mark, to determine a number of reads performed on the data.

In another embodiment, a data storage device comprises: a magnetic head comprising a read head and a write head; a magnetic storage media; and a controller coupled to the magnetic head and the magnetic storage media, wherein the controller is configured to: write a timestamp to the magnetic storage media, wherein the timestamp corresponds to a time that data was accessed on the magnetic storage media; read the data; and update the timestamp in response to the read data. The timestamp is disposed at a location adjacent to the read data. The timestamp is disposed between the read data and error correction data that corresponds to the data. The timestamp is coordinated with power-on timer information.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a magnetic head comprising a read head and a write head, wherein the write head comprises a write assist element;
a magnetic storage media; and
a controller configured to cause the data storage device to:
read data from the magnetic storage media using the read head; and
apply current to the write assist element, wherein the applied current:
is insufficient to cause data to be written to the magnetic storage media, and
changes an amplitude of the read data or a mark on the magnetic storage media;
wherein the magnetic storage media comprises a mark associated with a data sector on which the read data is stored, the mark being degraded by the applying the current.

2. The data storage device of claim 1, wherein the mark is disposed on a track different from the read data.

3. The data storage device of claim 2, wherein the mark is located to account for skew such that the write assist element is over the mark while the read head is reading a data sector storing the data.

4. The data storage device of claim 1, wherein the data can be read after changing the amplitude of the data.

5. The data storage device of claim 1, wherein the applying current to the write assist element occurs after reading the data.

6. The data storage device of claim 5, wherein the reading the data and the applying the current are performed concurrently.

7. The data storage device of claim 1, wherein when the amplitude of the mark is changed, the amplitude of the read data remains unchanged.

8. The data storage device of claim 1, wherein the magnetic storage media comprises a plurality of marks, each mark associated with a set of plurality of N data sectors.

9. The data storage device of claim 1, wherein the magnetic storage media is a hard disk drive.

10. The data storage device of claim 1, wherein the magnetic storage media is a magnetic tape.

11. A data storage device, comprising:
a magnetic head comprising a read head and a write head, wherein the write head comprises a write assist element;
a magnetic storage media; and
a controller configured to cause the data storage device to:
partially degrade data on the magnetic storage media or partially degrade a mark on the magnetic storage media, wherein the partially degrading is performed by the write assist element; and
cause the data to be read before or concurrently with the partially degrading.

12. The data storage device of claim 11, wherein the partially degrading after the data has been read a first time.

13. The data storage device of claim 11, wherein the controller is further configured to rewrite the data to a different location on the magnetic storage media after the partially degrading.

14. The data storage device of claim 11, wherein the controller is configured to repeat the partially degrading and the causing the data to be read.

15. The data storage device of claim 11, wherein the controller is further configured to measure an amplitude of the data or mark to determine a number of reads performed on the data.

16. The data storage device of claim 15, wherein the controller is further configured to extract metrics from a read channel processing signals from reading the data or mark, to determine a number of reads performed on the data.

17. A data storage device, comprising:
a magnetic head comprising a read head and a write head;
a magnetic storage media; and
a controller coupled to the magnetic head and the magnetic storage media, wherein the controller is configured to:
write a timestamp to the magnetic storage media, wherein the timestamp corresponds to a time that data was accessed on the magnetic storage media, and the timestamp is coordinated with power-on timer information;
read the data; and
update the timestamp in response to the read data.

18. The data storage device of claim 17, wherein the timestamp is disposed at a location adjacent to the read data.

19. The data storage device of claim 18, wherein the timestamp is disposed between the read data and error correction data that corresponds to the data.

* * * * *